(12) United States Patent
Jagtap et al.

(10) Patent No.: US 10,860,215 B2
(45) Date of Patent: Dec. 8, 2020

(54) DELAY MASKING ACTION FOR MEMORY ACCESS REQUESTS

(71) Applicant: Arm Limited, Cambridge (GB)

(72) Inventors: Radhika Sanjeev Jagtap, Cambridge (GB); Nikos Nikoleris, London (GB); Andreas Lars Sandberg, Cambridge (GB)

(73) Assignee: Arm Limited, Cambridge (GB)

(*) Notice: Subject to any disclaimer, the term of this patent is extended or adjusted under 35 U.S.C. 154(b) by 126 days.

(21) Appl. No.: 16/152,485

(22) Filed: Oct. 5, 2018

(65) Prior Publication Data

US 2019/0384501 A1 Dec. 19, 2019

(30) Foreign Application Priority Data

Jun. 18, 2018 (GR) .............................. 20180100261

(51) Int. Cl.
*G06F 3/06* (2006.01)

(52) U.S. Cl.
CPC .......... *G06F 3/0611* (2013.01); *G06F 3/0655* (2013.01); *G06F 3/0673* (2013.01)

(58) Field of Classification Search
None
See application file for complete search history.

(56) References Cited

U.S. PATENT DOCUMENTS

| 9,436,603 | B1 * | 9/2016 | Pohlack | G06F 21/556 |
| 2012/0059958 | A1 * | 3/2012 | Hnatko | G06F 13/1673 |
| | | | | 710/53 |

OTHER PUBLICATIONS

Köpf, Boris, and Markus Dürmuth. "A provably secure and efficient countermeasure against timing attacks." 2009 22nd IEEE Computer Security Foundations Symposium. IEEE, 2009. (Year: 2009).*
Ge, Qian, et al. "A survey of microarchitectural timing attacks and countermeasures on contemporary hardware." Journal of Cryptographic Engineering 8.1 (2018): 1-27. (Year: 2016).*
Jiang, Zhen Hang, Yunsi Fei, and David Kaeli. "A novel side-channel timing attack on GPUs." Proceedings of the on Great Lakes Symposium on VLSI 2017. 2017. (Year: 2017).*

(Continued)

*Primary Examiner* — Charles Rones
*Assistant Examiner* — Hewy H Li
(74) *Attorney, Agent, or Firm* — Nixon & Vanderhye P.C.

(57) ABSTRACT

An apparatus comprises control circuitry to control access to a memory implemented using a memory technology providing variable access latency. The control circuitry has request handling circuitry to identify an execution context switch comprising a transition from servicing memory access requests associated with a first execution context to servicing memory access requests associated with a second execution context. At least when the execution context switch meets a predetermined condition, a delay masking action is triggered to control subsequent memory access requests associated with the second execution context, for which the required data is already stored in the memory, to be serviced with a response delay which is independent of which addresses were accessed by the memory access requests associated with the first execution context. This can help guard against attacks which aim to exploit variation in response latency to gain insight into the addresses accessed by a victim execution context.

15 Claims, 6 Drawing Sheets

(56) References Cited

OTHER PUBLICATIONS

Wang, Zhenghong, and Ruby B. Lee. "Covert and side channels due to processor architecture." 2006 22nd Annual Computer Security Applications Conference (ACSAC'06). IEEE, 2006. (Year: 2006).*
Pessl et al., "DRAMA: Exploiting DRAM Addressing for Cross-CPU Attacks", *Proceedings of the 25th USENIX Security Symposium*, Aug. 10-12, 2016, 18 pages.

* cited by examiner

DELAY MASKING ACTION FOR MEMORY ACCESS REQUESTS

This application claims priority to GR Patent Application No. 20180100261 filed Jun. 18, 2018, the entire contents of which are hereby incorporated by reference.

BACKGROUND

Technical Field

The present technique relates to the field of data processing. More particularly, it relates to accessing a memory implemented using a memory technology providing variable access latency.

Technical Background

Some types of memory technology used in data processing systems may provide a variable access latency. Hence, sometimes memory access requests may be serviced with a longer latency than other times. More particularly, with some forms of memory technology the access latency may depend not only on whether the required data is already stored in the memory, but even in cases where the required data is stored in the memory, there may be variation in the access latency depending on which particular location in the memory stores the required data and/or depending on previously accessed addresses.

SUMMARY

At least some examples provide an apparatus comprising: control circuitry to control access to a memory implemented using a memory technology providing variable access latency, the control circuitry comprising: interface circuitry to receive memory access requests for servicing by the memory, and to provide responses to memory access requests serviced by the memory; and request handling circuitry to: identify an execution context switch comprising a transition from servicing memory access requests associated with a first execution context to servicing memory access requests associated with a second execution context; and at least when the execution context switch meets a predetermined condition, trigger a delay masking action to control subsequent memory access requests associated with the second execution context, for which the required data is already stored in the memory, to be serviced with a response delay which is independent of which addresses were accessed by the memory access requests associated with the first execution context, said response delay comprising a delay between receipt of the memory access request by said interface circuitry and provision of a response to the memory access request by said interface circuitry.

At least some examples provide a method for controlling access to a memory implemented using a memory technology providing variable access latency, the method comprising: receiving memory access requests for servicing by the memory, and providing responses to memory access requests serviced by the memory; identifying an execution context switch comprising a transition from servicing memory access requests associated with a first execution context to servicing memory access requests associated with a second execution context; and at least when the execution context switch meets a predetermined condition, triggering a delay masking action to control subsequent memory access requests associated with the second execution context, for which the required data is already stored in the memory, to be serviced with a response delay which is independent of which addresses were accessed by the memory access requests associated with the first execution context, said response delay comprising a delay between receipt of the memory access request by said interface circuitry and provision of a response to the memory access request by said interface circuitry.

Further aspects, features and advantages of the present technique will be apparent from the following description of examples, which is to be read in conjunction with the accompanying drawings.

DESCRIPTION OF EXAMPLES

A data processing apparatus may have security mechanisms for ensuring that some secret information is accessible to certain execution contexts running on the data processing system but cannot be accessed by other execution contexts. For example, an execution context may be associated with a given privilege level and some data may be accessible only to a context having a certain privilege level or higher. For example memory protection techniques can be used to enforce the desired memory access permissions.

However, it has been recognised that the variable access latency provided by certain forms of memory technology can be exploited by attackers to circumvent some security protections provided restricting access to certain sensitive information. For example, the attacker's execution context and a victim execution context which has access to sensitive information not accessible to the attacker may each allocate data into a given memory. If the victim context first accesses its data and then following an execution context switch to the attacker's context, the attacker context accesses its data, then with some memory technologies the latency in responding to memory access requests issued by the attacker context may depend on which addresses were accessed by the victim context before the execution context switch. This can allow information about the operation of the victim context to be deduced, which could leak some side-channel information about the secret information.

One approach for mitigating against such attacks could be to use a fixed latency policy where any memory access request for which the required data is already stored in a given memory is serviced with a response delay which is equal to some predetermined constant latency. However, this may be harmful to performance since often the constant latency would need to be the worst case delay provided by the memory device, and so this may unnecessarily involve delaying large numbers of requests to slow down the performance of the processing system.

The apparatus described below provides control circuitry to control access to a memory implemented using a memory technology providing variable access latency. For example the control circuitry could be a portion of an interconnect or a memory controller. The control circuitry has interface circuitry to receive memory access requests to be serviced by the memory and to provide responses to memory access requests that have been serviced by the memory. The control circuitry also has request handling circuitry to identify an execution context switch comprising a transition from servicing memory access requests associated with a first execution context to servicing memory access requests associated with a second execution context. At least when the execution context switch meets a predetermined condition, the request handling circuitry triggers a delay masking action to control subsequent memory access requests associated with the second execution context, for which the required data is already stored in the memory, to be serviced with a response delay which is independent of which addresses were accessed by the memory access request associated with the first execution context. Here the response delay refers to a delay between receipt of the memory access request by the interface circuitry and provision of a response to the memory access request by the interface circuitry.

By providing control circuitry which is able to identify when there is a transition from servicing memory access requests associated with a first execution context to servicing memory access requests associated with a second execution context, this means it is not necessary to trigger the delay masking action on every memory access request. Instead the delay masking action can be triggered at least when the execution context switch meets a predetermined condition. This can help to reduce the performance cost of mitigating against the types of security attack discussed above which exploit variable access latency in memory. By triggering performance of a delay masking action in response to an execution context switch meeting the predetermined condition, this means that the latency associated with responding to memory access requests following the change of execution context does not depend on which addresses were accessed by the memory access request associated with the first execution context. Hence if the second execution context is an attacker context and the first execution context is a victim context, the attacker is unable to learn information about which addresses were accessed by the victim context from analysing the delays associated with accessing memory from the attacker context.

In some examples, at least when the execution context switch meets the predetermined condition, the response handling circuitry may ensure that at least one subsequent memory access request associated with the second execution context, for which the required data is already stored in the memory, is serviced with a constant response delay. For example with a memory which comprises multiple storage units (e.g. banks) accessible in parallel, the at least one subsequent memory access request handled with a constant response delay could comprise at least a first memory access request to each storage unit that is serviced after the execution context switch. Note that the first memory access request serviced after the execution context switch may be the first memory access request for which a response is provided by the memory, which may not necessarily be the first memory access request received by the memory after the execution context switch. Some memories may implement a quality of service policy which allows requests to be serviced out-of-order compared to the order in which they were received. Therefore, sometimes the first memory access request serviced after the execution context switch could actually be the second or third request received after the execution context switch, for example.

By ensuring that at least the first memory access serviced by a given storage unit after the context switch is handled with a constant response delay, this can make it harder for an attacker to gain information on the addresses which were accessed immediately before the context switch by a different execution context. In some cases, more than one subsequent memory access request to each storage unit could be handled with a constant response delay. For example, in some cases to improve security the constant response delay may be imposed for a certain period after the context switch with the length of the period set depending on the level of security required for a given implementation.

In other examples, the response delay imposed following the execution context switch may not need to be a constant, but could be some random value which is independent of any pattern of addresses accessed before the context switch. As long as the response delay is not correlated with which addresses were accessed before the first execution context then this is enough to avoid the attacker being able to gain information on the operation of the victim context by analysing the access timings.

In some implementations, after the execution context switch, the request handling circuitry may control servicing of at least one subsequent memory access request associated with the second execution context for which the required data is already stored in the memory, with a variable response delay depending on the variable access latency provided by the memory. Hence, it is not necessary to impose a fixed latency or random latency on all requests. For example, the delay masking action may affect one or more subsequent requests in an initial period following the context switch, but then the delay masking action could be removed (or certain subsequent requests may not be affected by the delay masking action), when it is no longer necessary to ensure that the response delay for later requests is totally independent of the previously accessed addresses. This recognises that the risk of information leakage may be highest immediately after a context switch, but then the risk may decrease as more requests from the new context are serviced, because the greater the number of requests serviced in the new context, the more likely it is that the response timings depend on the activity of the new context rather than the activity of the previous context.

For example, the at least one subsequent memory access request (for which the response delay may be variable depending on the variable access latency provided by the memory), may be a memory access request to a block of one or more memory locations already accessed by another memory access request serviced since the execution context switch. In some forms of memory, the variable access latency of the memory may be such that the access latency is lower when the memory access request accesses a memory location in a first state than when the memory access request accesses a memory location in a second state, where an access to a memory location in the second state triggers a transition of a corresponding block of one or more memory locations from the second state to the first state.

For example, some memory technologies may require a block of memory locations to be opened, activated or buffered in a buffer before any memory location in that block can be read/written. If a memory location to be accessed is not currently in an open/activated/buffered block of memory locations, then the block comprising that memory location may need to be opened/activated/buffered (i.e. a transition from the second state to the first state), and if another block is already open/activated/buffered then that other block may need to be closed/deactivated or overwritten in the buffer (which could require writebacks to the underlying memory storage array), i.e. a transition from the first state to the second state. The block of memory locations transitioned between the first/second states as a whole unit may correspond to a page of a DRAM structure, a row of a memory storage array, or a group of two or more rows, for example.

Another example of a memory technology with variable response delay may be a memory which uses a physical read head moving over a storage medium, e.g. a spinning disk drive. In this case, the distance the head needs to travel (and hence latency) to reach the desired location is dependent on the location of the previous read request and the current read request. Hence, the platters (spinning disks) may effectively correspond to banks of a DRAM and the current location of the read/write head may effectively correspond to an "open" block of locations as discussed herein for DRAM. The "first state" could be a state when the distance the head needs to travel to the desired location from its current location is less than a certain threshold, while the "second state" could be a state when the distance between the current location and desired location is more than the threshold. For accesses to a block of one or more memory locations that has already been accessed at least once since the execution context switch, the risk of timing side-channel attacks can be relatively low, because the already serviced request to the same block by the second execution context would have caused the block of memory requests to be in the first state (open/activated/buffered) regardless of whether or not the same block was previously accessed in the first execution context prior to the execution context switch. Hence, by allowing the response delay to be variable depending on the actual delay incurred by the memory for requests associated with the second execution context which target a block of locations already accessed by another memory access request at the second execution context which has been serviced since the execution context switch, this can improve performance without exposing the second execution context to risk of attack from the first execution context.

The request handling circuitry may detect execution context switches in different ways. In one example, the request handling circuitry may detect an execution context switch as meeting the predetermined condition when a context switch barrier indication is detected in a stream of memory access requests by the interface circuitry. For example the processing element or interconnect responsible for generating or forwarding/routing the memory access request could introduce additional barrier indications when the processing element has switched from executing one execution context to switching another execution context, so that the control circuitry associated with the memory can then detect the point at which subsequent memory access requests relate to a different execution context. Hence when a barrier is included in the stream of memory access requests this may be interpreted as a context switch by the request handling circuitry so that the delay masking action can then be triggered to ensure that at least one subsequent request is serviced with a response delay which is independent of previously accessed addresses.

In some cases, the context switch barrier indication could be generated automatically by hardware in a processing element or memory system component (e.g. interconnect) based on a detection of a switch of execution context at the processing element, such as based on interrupts which trigger a change of context, or on context identifiers associated with the current architectural state of the processing element. In other examples, the context switch barrier indication could be generated in response to a software trigger, such as a barrier generating instruction included in the software executed on the processing element of the data processing apparatus. Hence, a software programmer or compiler can increase security within program code by including barrier instructions which trigger the generation of the context switch barrier indication, so that the programmer or compiler can ensure that a subsequent part of the program cannot gain information about the operation of an earlier part of the program preceding the barrier generating instruction. Other examples may support both hardware and software generated barriers.

Another approach can be to detect the execution context switch based on execution context identifiers associated with at least a subset of memory access requests received by the interface circuitry. For example the apparatus may have at least one processing element to issue the memory access request received by the interface circuitry and a given processing element may generate the execution context identifier associated with a given memory access request. For example a processing element could tag its memory access request with the identifier of the currently executing execution context which caused that memory access request to be generated. It is not necessary for every memory access request to be tagged with the execution context identifier. For example in some systems the processing element could only provide the execution context identifier when there is a change of execution context and when memory access requests are received which do not specify an execution context identifier then it may be assumed that they relate to the same execution context as the most recently received memory access request which did specify an execution context identifier. Alternatively, in a system having multiple processing elements then in order to distinguish between the requests generated by multiple processing elements (which could be intermingled), it may be preferred to have every memory access request specifying the execution context identifier of the corresponding context switch that generated the request. Hence, the precise manner in which requests are tagged with execution context identifiers may vary from implementation to implementation.

Each execution context can in general be a portion of the software workload executed on the data processing apparatus. For example an execution context could refer to a certain process or group of processes executed by a processing element, or a virtual machine executed by a given processing element or a sub-portion within a process, application or virtual machine for example. Some processes could be divided into portions corresponding to separate execution contexts (e.g. different browser tabs within an internet browser may be protected from each other for security purposes by allocating different execution context identifiers to each tab). Alternatively, in some cases multiple different processes which are not deemed at risk of attacking each other could be grouped into a single execution context identified by a single value of the execution context identifier. In other examples, the execution context may refer to a group of one or more processes which operate according to a certain security mode or at a given exception level or privilege level (e.g. different processes executing at the same privilege level or security mode could be seen as the same execution context). Also, in some cases the software executing on a given processing element could itself provide indications of what parts of the software workload being carried out should be regarded as particular execution contexts, and so in some cases software-specified identifiers may be used to distinguish different execution contexts. Also, which specific processing element of a multi-processing element system is executing the context could form part of the execution context identifier, so that exactly the same software process when executed on different hardware processing elements of the multi-processing system could be regarded as different execution contexts for the purpose of the control circuitry determining whether to apply the delay masking action following a context switch to or from the corresponding execution context.

Hence, a given processing element may generate the execution context identifier associated with a given memory access request based on at least one of:
  a process identifier or address space identifier associated with a process executing on the processing element;
  a virtual machine identifier associated with a virtual machine executing on the processing element;
  a processing element identifier associated with the given processing element;
  a security mode identifier identifying a current security mode of operation of the given processing element;
  an exception level identifier identifying a current exception level of the given processing element; and
  a software-specified identifier provided by software executing on the processing element.

Note that the "execution context switch" detected by the control circuitry refers to the point at which there is a transition between memory access requests handled from one execution context and memory access requests associated with a different execution context. The time at which the control circuitry identifies the execution context switch in the stream of memory access requests processed may be different to the time at which the corresponding processing element actually switched which execution context's instructions are being executed (e.g. the control circuitry may not see the execution context switch until some time after the corresponding switch at the processing element).

In some example implementations, the selection of the order in which memory access requests received by the interface circuitry are serviced by the memory may be made independent of the execution context associated with each request. For example, some examples could simply select requests to be serviced in the same order in which they are received. Other examples could be more sophisticated and permit reordering of requests, so that requests which target the same block of memory locations in the memory can be grouped together so as to reduce the access latency of those accesses targeting the same block. In any case, the circuitry selecting the order in which requests are serviced may also have to respect other constraints, such as data dependencies between consecutive requests to the same address (which may have to be serviced in the same order in which they are received) and possibly other requirements such as whether requests relate to device-type memory (for which reordering of the requests compared to the order in which they are received may not be allowed even for requests not having a data dependency). Hence there may be a number of criteria for selecting the order in which the received requests are serviced. If the execution context is not factored into this selection then it is possible that the sequence of requests passed to the memory may include a number of individual requests each relating to different execution context, so that there will be frequent execution context switches each time there is a request from a different context immediately following a request from a previous context. This may be simpler to implement within the control circuitry, however it may result in the delay masking action being triggered often which could impact on performance.

Hence, in some examples the request handling circuitry may be arranged to group memory access requests associated with the same execution context together as a group of requests to be serviced consecutively by the memory. The request handling circuitry may trigger performance of the delay masking action when switching from a group of memory access requests associated with the first execution context to a group of memory access requests associated with the second execution context at least when the switch from the first execution context to the second execution context meet the predetermined condition. Hence, rather than merely passively observing when there is an execution context switch between a memory access request associated with one execution context and a request associated with another context, in some cases the request handling circuitry may actively control when there is such an execution context switch so that the execution context switch is identified when the request handling circuitry decides to switch from servicing a group of requests associated with the first execution context to a group of requests associated with the second execution context. This can improve performance by reducing how often the delay masking action is triggered.

In approaches which group memory access request from the same context together, there may still be a number of other criteria applied to determine the order in which requests are serviced, such as data dependencies, ordering constraints, device type memory, etc. Hence, in some cases the request handling circuitry may be constrained as to how many requests from a given execution context can be grouped together. Nevertheless in general by grouping requests from the same execution context together when this is possible, this can help to improve performance.

In some implementations the request handling circuitry could simply trigger the delay masking action following any execution context switch, regardless of whether the execution context switch meets the predetermined condition. While it is possible that some transitions of execution context may not be at risk of the type of security attack discussed above, this approach can prioritise security over performance. Even if the delay masking action is triggered for every execution context switch, some forms of delay masking action may only be applied to a certain number of requests following the execution context switch so that some performance can be saved by not adding additional delays to every request following the context switch.

However, in other examples the request handling circuitry may omit triggering the delay masking action when the execution context switch fails to meet the predetermined condition. Hence, the request handling circuitry may make a judgement as to whether the particular switch of execution contexts causes a risk of security vulnerabilities. For example, in one example the predetermined condition may be whether the second execution context is a context which is prohibited from accessing at least some data which is accessible to the first execution context. For example this could be determined based on the privilege levels associated with the first and second execution contexts respectively. In some cases the predetermined condition may be that the second execution context is a less privileged execution context than the first execution context, so that an attacker having a lower level of privilege is not able to gain information on which addresses were accessed by a more privileged context, which if the address pattern accessed by the more privileged first execution context was dependent on some bits of secret information could allow some parts of the secret to be deduced by the attacker. In other systems there may also be some security mechanisms for preventing a more privileged context accessing data which is accessible to a less privileged context (e.g. in data centre applications, it may be desirable for different virtual machines executing on the same physical platform to privately access some secret data which cannot be accessed by the hypervisor operated by the cloud platform provider). Hence, if such mechanisms are provided then it may be considered that the predetermined condition should also be satisfied when the second execution context is a more privileged process than the first execution context. In some cases the predetermined condition may comprise that the second execution context is a context associated with a different privilege level to the first execution context (so the delay masking action can be omitted for transitions between contexts in the same privilege level).

In other examples, rather than being based on privilege level, some systems may have secure and non-secure modes where context executing in a non-secure mode does not have access to data accessible in the secure mode. Hence in some cases the predetermined condition may comprise a second execution context being a context associated with the non-secure domain and the first execution context being associated with the secure domain, so that the delay masking action is triggered on a switch from a secure context to a less secure context, but not when there is a transition in the opposite direction as it may not be considered important to prevent a secure process gaining information on addresses accessed by a non-secure process.

In other examples, the predetermined condition could be the first execution context being one of a predetermined subset of execution contexts. For example, specific contexts may be designated as in need of protection and any context not on the list of protected contexts could be considered not in need of the protections provided by the delay masking action. For example certain critical execution contexts may be designated as requiring the additional security protection and so when the request handling circuitry detects an execution context from one of those critical execution contexts to another context then it may apply the delay masking action, but otherwise the delay masking action could be omitted to improve performance.

The delay masking action can be implemented in a number of different ways. In general the delay masking action may be any action which ensures that subsequent memory access requests associated with the second execution context following the context switch, for which the required data is already stored in the memory, are serviced with a response delay which is independent of which addresses were accessed by requests associated with a first execution context before the execution context switch. The technique discussed above can be applied to various memory devices in a data processing system, including both main memory and caches. For main memory which is not operated as a cache, then any request targeting an address mapped to that memory will have the required data stored in the memory already, so that there is no prospect of the memory access request requiring data not already stored in the main memory. On the other hand, for a cache memory access requests may encounter a cache hit or a cache miss, depending on whether the required data has already been allocated to the cache, which may depend on previously accessed addresses. In cases where the memory is a cache and the memory access requests miss in the cache so that the required data is not already stored in the memory, then even if the delay masking action is performed, the response delay may still depend on which addresses were accessed prior to the context switch, since a cache miss may require the data to be fetched from a further cache or from main memory, and the time taken to service this linefill request may vary depending on the extent to which the data has already been cached in the further caches within the memory system. Known techniques, such as flushing caches in response to an execution context switch or partitioning the cache into regions reserved for particular execution contexts, can be used to mitigate against attacks aimed at exploiting the timing variation caused by the different levels of cache at which data may be allocated.

In contrast, the delay masking action discussed herein is for addressing variation in delay associated with memory access requests for which the required data is already stored in the memory, i.e. requests to a non-cache memory device for which the occupancy of the memory does not depend on previous accesses (i.e. there is no cache-like eviction and allocation of data to the memory based on recent address patterns), or requests which hit in a memory used as a cache (rather than requests which result in a cache miss).

In a memory using a technology which has memory locations in a first state or second state as discussed above, where there is a lower access latency when a request is made to block in the first state than when the memory access request accesses a block in the second state, the delay masking action could in some cases comprise controlling the memory to transition any blocks currently in the first state from the first state to the second state. For example, the delay masking action could comprise closing or deactivating one or more pages or rows of memory locations, or clearing a buffered block of locations and writing it back to the storage array. This means that following the execution context switch meeting the predetermined condition, the next request serviced after the execution context switch is serviced with a latency corresponding to the second state.

For example, with a DRAM based memory, the latency corresponding to the second state could correspond to the delay associated with accessing a closed row within a bank of DRAM where there is not already any row currently open. Hence, in some cases the constant delay applied for at least some memory access requests following the context switch may correspond to the bank closed access delay of the DRAM. When the delay masking action comprises triggering closing of pages of memory locations as discussed above, then this may mean that the first access serviced in each bank following the context switch may have a constant delay (second state latency) corresponding to the bank closed condition, but then subsequently serviced requests associated with the second execution context which access the same page as an earlier serviced request associated with the second execution context, could still be serviced with the page open delay (first state latency) if they access the same page as another request serviced since the execution context switch. Hence, while the closing of pages of memory locations (or transition from first to second state) may be enough to make sure that the response latency of all subsequent requests of the second execution context is independent of the address pattern accessed by the first execution context, this does not require every subsequent request of the second execution context to be serviced with a fixed delay (as requests can be handled faster when they access an already opened page of memory locations), to improve performance.

Alternatively, the delay masking action could comprise delaying one or both of: (i) a memory access request serviced after the execution context switch, or (ii) a response to memory access request serviced after the execution context switch, by retaining the request or the response in a delay buffer for some time to mask an actual access latency provided by the memory when servicing the at least one memory access request. In some approaches this could save energy because the act of closing or deactivating pages of memory locations may require pre-charging of signal lines within the memory structure which costs energy. Rather than actually closing locations within the memory, the open/activated pages resulting from the access patterns in the first execution context could be retained as open when switching to handling memory access requests associated with the second execution context, but a delay buffer may be used to simulate a delay as if the pages had been closed/deactivated so that even if a request of the second execution context targets the same page also accessed by the first execution context, the second execution context cannot determine from the response latency that the first execution context accessed the same page of the memory structure.

In some examples, during a delay period when the memory access request or the response is delayed in the delay buffer, the request handler may control the memory to service at least one other request targeting a same page in the memory as the delayed memory access request. For example, the other request could be another memory access request (read or write request), a writeback request triggering a writeback from a cache to memory, or a refresh operation for refreshing contents of the memory in a type of memory which requires periodic refreshing to retain its state. This approach may allow the request handler to make use of the delay period (when a given request of response is being delayed in order to simulate the memory being slower than it is actually servicing the request) to service another request in the meantime so that it is not necessary to wait until the simulated delay has expired before servicing that other request. This can improve performance.

A given memory device may service different types of request, such as read requests requesting that data is read from the memory, and write requests requesting that data is written to the memory. In general, the read and write requests may be requests which are directly triggered by software executing on a processing element or by a hardware element such as a prefetcher which prefetches data from memory based on the observed activity of a given execution context executing on the processing element. Such requests may be relatively simple to associate with particular execution contexts, for example the processing element which generated the read or write request could tag the requests with the identifier of the execution context currently being executed.

However, another type of request which may need to be serviced by the memory may be a writeback request which is a request that cached data is written back from a cache to the memory. In this context, the memory could be a further level cache to which data is written from a cache located closer to the processing element, or could be the main memory acting as the backing store to one or more levels of caches. With writeback requests, the timing at which the writeback request is issued may be decoupled from the time at which the data was written to the cache by a processing element under control of a given execution context. Hence, at the time of issuing the writeback request it may be harder to identify which execution context is associated with that writeback request. For example the timing at which a writeback request is issued may depend on when the corresponding data is evicted from the cache, which may depend on subsequent access patterns of addresses which have nothing to do with the execution context which actually wrote the data in the first place. In some implementations, it may be considered that as the timing at which writeback requests are issued really depends on the cache control policy adopted, which may be relatively hard to influence by an attacker, then the risk of an attacker gaining information on the operation of a victim process, based on the memory access latency experienced by writeback requests or by subsequent requests after the writeback request, may be relatively low. Therefore, in some implementations the request handling circuitry may not attempt to identify particular execution contexts associated with writeback requests.

However, in other systems with a greater security requirement it may be desired to also mitigate against potential side-channel attacks exploiting the variation in timing of a memory access request associated with an attacker process following a writeback request which relates to data which was initially written by a victim process. A number of options are available for mitigating against such attacks.

In a first example, the request handling circuitry may identify that writeback requests which request writeback of cached data from a cache to the memory are associated with a dedicated writeback execution context, independent of the execution context which actually caused the cached data to be allocated to the cache. Hence, all writeback requests may simply be assumed to relate to their own special execution context so that writeback requests may be grouped together in a similar way to requests from other execution contexts as discussed above. When there is a switch from handling a block of writeback requests to handling requests from a real (non-writeback) execution context, the request handling circuitry may identify this as an execution context switch which meets the predetermined condition, and so may trigger performance of the delayed masking action. By grouping writeback requests together, this may reduce the frequency with which there are switches between handling a writeback request and handling a memory access request associated with a real execution context, which can reduce the vulnerability to side-channel attacks.

Another approach can be that each individual writeback request is effectively treated as its own execution context, so that any transition from servicing a given writeback request to servicing another request (e.g. a different writeback request or a non-writeback memory access request) is treated as an execution context switch. Hence, the request handling circuitry could ensure that following servicing of a given writeback request, the delay masking action may be performed so that a next memory access request or a next writeback request serviced by the memory, for which the required data is already stored in the memory, is serviced with a response delay independent of the address specified by the given writeback request. For example, the page or block of the memory structure that was accessed by the writeback request could be transitioned to the second state (e.g. closed or deactivated) before servicing the next request following the writeback request, so that it can be guaranteed that even if the writeback request was associated with a victim process of interest to an attacker, the attacker's next memory access request cannot be used to gain information on which address was written back.

A third option may be for the cache which stores the cached data to store an indication of the execution context identifier alongside the cached data itself, so that when the cache generates a writeback request to writeback a predetermined block of cached data to the memory, the writeback request can be tagged with the execution context identifier associated with that block of cached data. With this approach, the request handling circuitry can identify the actual execution context associated with the cached data, and can group it together with requests from the same execution context if necessary. In other words, with this approach the request handling circuitry may treat writeback requests in the same way as discussed above for regular memory access requests, using an execution context identifier specified by the request to identify context switches. While this approach may increase the storage capacity required in the cache, this can reduce the risk of leakage of information through information about the address patterns accessed by writeback requests.

The technique discussed above can be applied to a range of memory technologies, such as DRAM, non-volatile RAM (NVRAM) such as flash memory, or a spinning disk memory or other form of memory technology using a physical read head which moves over the storage medium. It is particularly useful in forms of memory technology where, in order to access a given memory location, the corresponding page, row, or group of rows of the memory structure is read into a buffer, and then reads and writes to that page, row or group of rows can be serviced from the buffer faster than a request requiring a different non-buffered region of memory. DRAM and NVRAM are examples of this, but it will be appreciated other forms of technology could have similar variable latency depending on the current buffered/non-buffered state of the accessed memory location.

Figure 1:
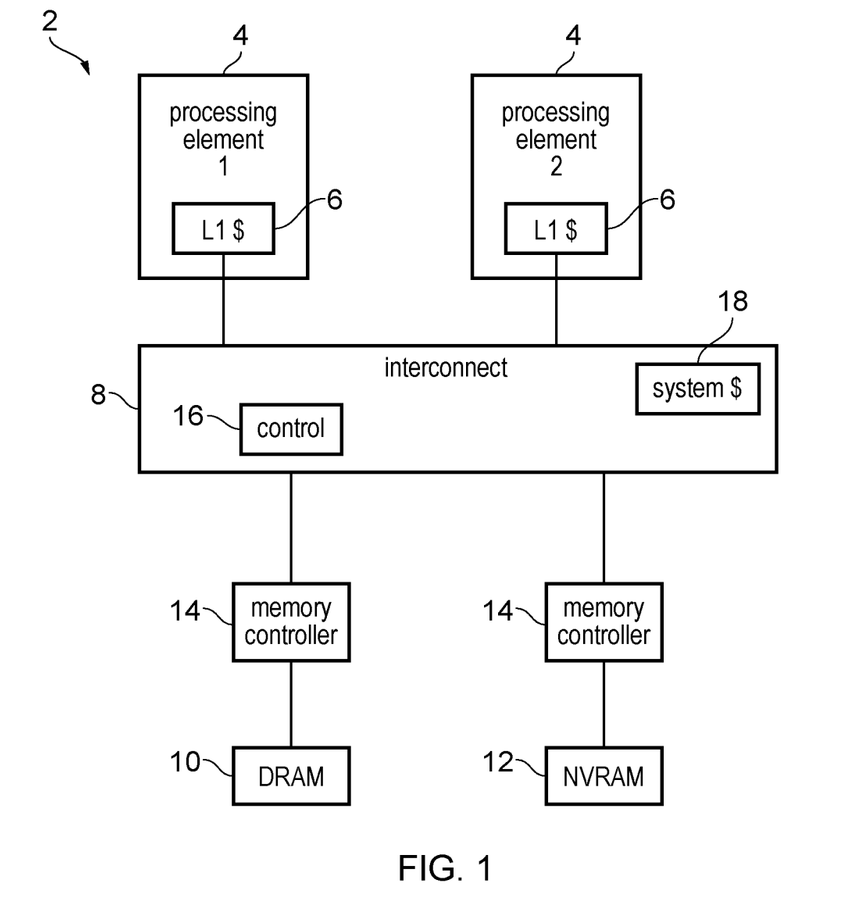
FIG. 1 schematically illustrates an example of a data processing system including at least one memory device.

FIG. 1 schematically illustrates an example of a data processing system 2 having a number of processing elements 4, such as processor cores, central processing units (CPUs), graphics processing units (CPUs) or any other device capable of issuing requests for access to data from the memory. At least some of the processing elements 4 may have at least one cache 6 for caching data from the memory system for faster access by the processing element 4. An interconnect 8 may be provided to manage coherency between the respective caches 6 of the processing elements 4 and also to route requests for data reads and writes to the main memory. A number of memory devices may be provided within the memory system such as a DRAM unit 10 and a non-volatile (NV) RAM 12. It will be appreciated that these are just some of the types of memory that can be provided. Each memory device 10, 12 has a memory controller 14 associated with it for managing the access to that memory device. The interconnect 8 may have control circuitry 16 for controlling the routing of memory access requests to the memory controllers 14 and to other slave devices not shown in FIG. 1. In some cases the interconnect 8 may include a system cache 18 which is shared between the processing elements 4 and caches some data from the main memory 10, 12 for faster access by the processing elements 4 than if it had to be fetched from main memory.

Any known coherency protocol may be used by the interconnect 8 to manage the coherency between the different caches. It will be appreciated that FIG. 1 is just one example of a possible implementation of a data processing system and that many variations on this arrangement may be possible.

Figure 2:
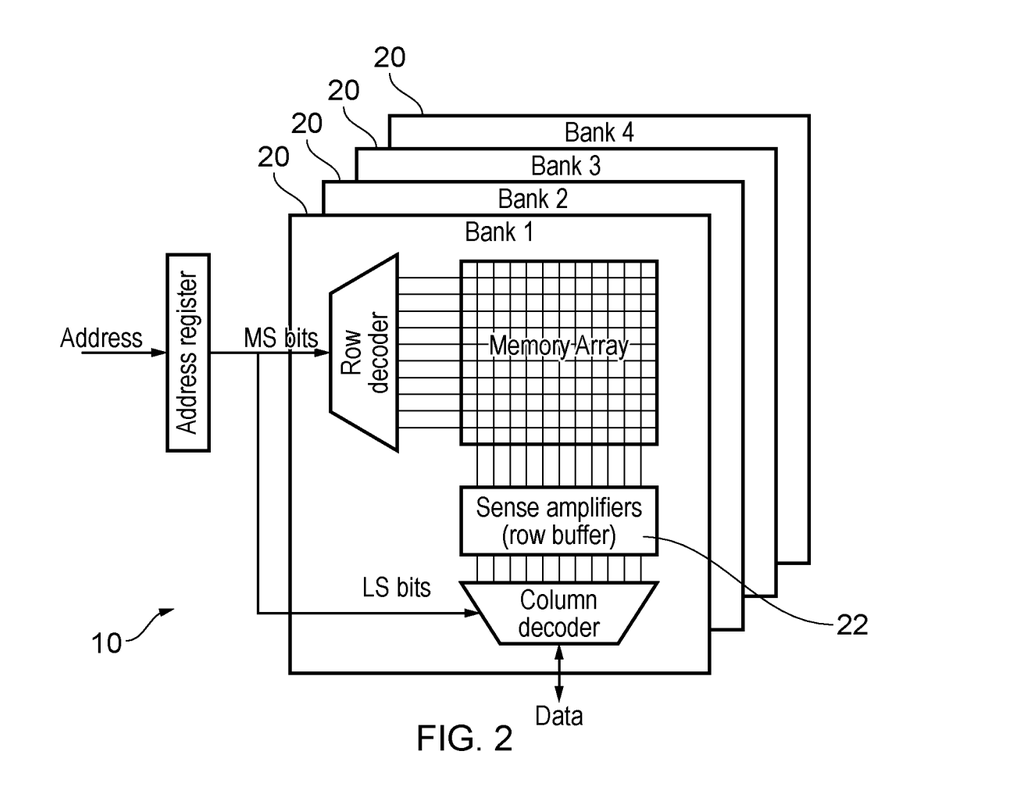
FIG. 2 illustrates an example of a memory device implemented using dynamic random access memory (DRAM)

FIG. 2 shows an example of a memory structure for the DRAM unit 10. Multiple banks 20 of a DRAM chip 10 can be accessed independently and thus requests to different banks can be serviced concurrently. This is called bank-level parallelism. The banks 20 are examples of storage units which can be accessed in parallel. Each bank 20 has a row buffer 22. Each bank 20 is organized in rows and columns, and data in a DRAM bank can only be accessed from the bank's row buffer 22, which serves as a buffer for the last accessed memory row in that bank.

Subsequent accesses to the same row can be serviced by accessing the row buffer 22 (row buffer hit), which reduces the latency compared accessing the DRAM cells in other rows. This is referred to as row buffer locality. Therefore, DRAM access has a variable latency depending on:

1. desired row is open, i.e. row buffer hit: low access latency, example 18+ ns
2. bank is closed/precharged (no row is currently open): medium access latency, example 32+ ns
3. different row open in the same bank as the desired row (also known as bank conflict): high access latency, example 42+ ns.

While FIG. 2 shows an example for a DRAM memory unit 10, other types of memory may similarly have multiple parallel storage units 20 which can be accessed in parallel, each of which has a buffer 22 for buffering at least one row or "page" of the memory structure, such that access to a given memory location has a lower latency when the memory location is in a first state (buffered in the page buffer 22) than when the memory location is in a second state (not buffered in the page buffer 22). Note that the term "page" in the context of DRAM or another memory unit refers to the unit of the memory storage array which can be placed in the row buffer 22 at a time. This differs from the operating system (OS) "pages" which refer to the size of the unit of memory addresses (granularity) for which address translation, memory allocation or memory protection is managed.

The mapping of a physical address to a DRAM or other memory units, while typically undocumented, is not a secret, and should not be relied upon for security. The mapping can be recovered with measurements and deductive reasoning, and there are tools publicly available to assist with this.

The variable latency depending on the current state of the accessed memory location, and the openly accessible or deducible mapping of physical addresses to DRAM can cause some problems. The memory unit 10, 12 and memory controller 14 may be resources shared at the system level. As with any resource shared between sensitive code and potentially untrustworthy code (e.g. Javascript in a browser), care must be taken to avoid side channels. Bank conflicts expose different timings and can be used as a timing side channel. Detecting open rows within a page can be used as another side channel.

Figure 3:
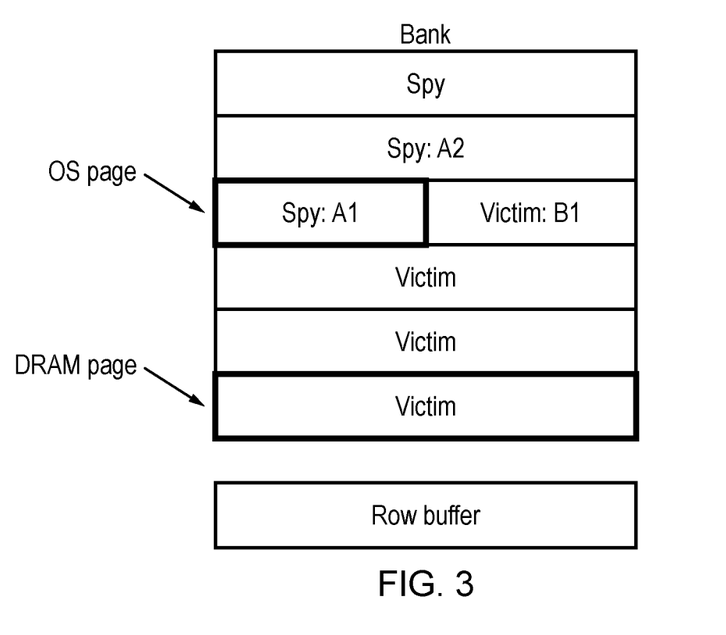
FIG. 3 illustrates an example of an attack for gaining access to secret information associated with a victim execution context based on analysing variation in access latency to a memory.

For example, as shown in FIG. 3, the timing side channel can leak specific address accesses enabling malicious user to spy on another user simply going about its own business. First the spy finds out vulnerable addresses of the victim process. Then the spy can allocate data co-located in the same DRAM page as the vulnerable data and infer whether the vulnerable address was accessed. For example, the attack could include the following steps:

two processes allocate data to the same DRAM page, although they belong to different OS pages (victim address B1 and spy address A1)

The spy process (attacker) reads A2 (or any other row in the bank except for A1)

The spy process lets the victim process do some work.

The spy process then reads A1 and measures the response latency for the memory access request:

If a row hit, then infer that the victim accessed B1

If a row miss, then infer that the victim did not access B1.

By repeating such attacks, the spy can then deduce information about the address patterns accessed by the victim, which could be used to leak information on secret data or gain information about the operation of the victim process which could be used to inform other types of attack.

Another example of an attack which would not require the OS to allocate victim and spy data to physically consecutive addresses could be as follows:

(1) The attacker primes the row buffer by accessing A1 (or any other address An that maps to bank X);
(2) the attacker lets the victim run;
(3) The attacker probes the row buffer by accessing A1 or An again to figure out whether the victim accessed the same bank, hence deducing some information about the victim through the accessed location.

Figure 4:
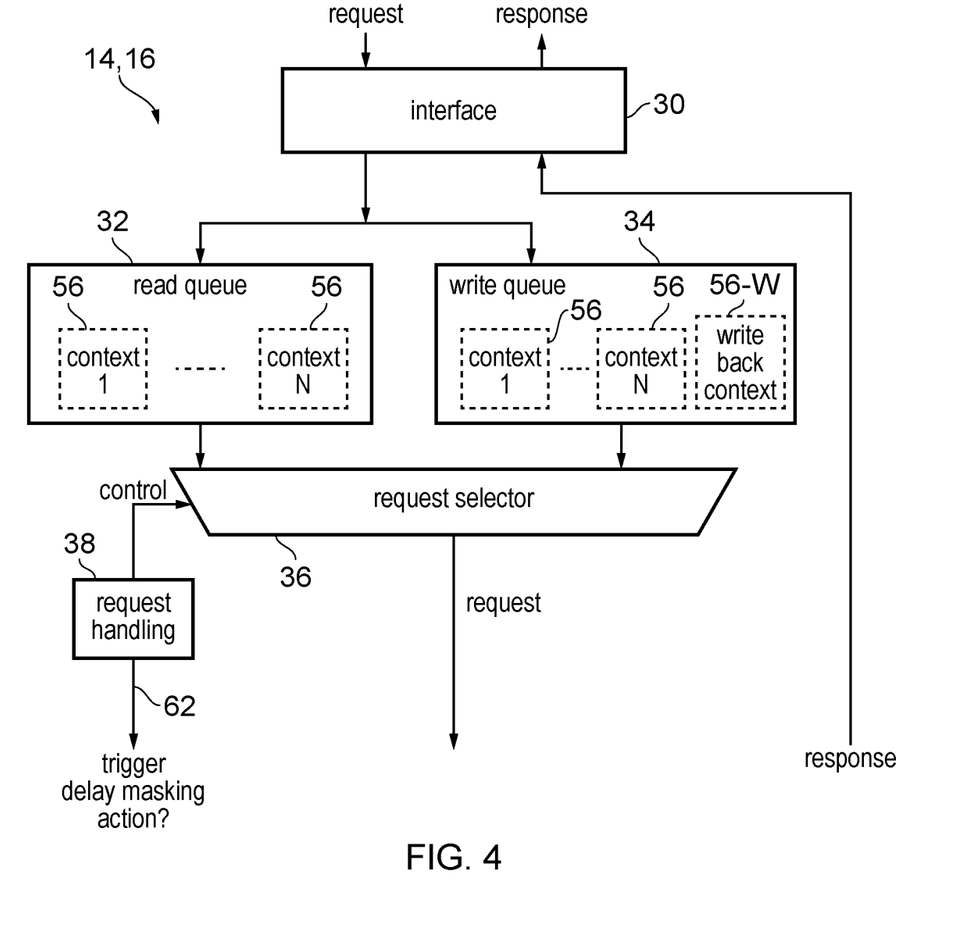
FIG. 4 shows an example of control circuitry having request handling circuitry to identify execution context switches and trigger a delay masking reaction in response to an execution context switch meeting a predetermined condition.

FIG. 4 illustrates an example of control circuitry 14, 16 for controlling access to a memory, which is able to trigger a delay masking action to mask the potential timing channel information that can be otherwise derived by an attacker. The control circuitry could be the memory controller 14 for a specific memory unit or could be control logic 16 within an interconnect 8 for example. The memory controlled by the control circuitry could be a specific main memory unit such as the DRAM 10 or NVRAM 12 or a cache 6, 18. While caches have traditionally been implemented using SRAM (static random access memory) technology, for which access latency is typically the same for each physical storage location of the storage array, as cache capacity increases there is increasing interest in using DRAM for caches, so that a similar problem arises to the DRAM attack discussed above.

The control circuitry has an interface 30 for receiving memory access requests from upstream components and for providing responses to those requests to the upstream components once the request has been serviced by the memory 10, 12. Although not shown in FIG. 4, the control circuitry may also have a downstream interface for transmitting a selected request for servicing by the memory and for receiving the corresponding response from the memory.

The received requests are allocated to one of a number of queues, for example a read queue 32 and a write queue 34, and requests are selected from the respective queues 32, 34 by a request selector 36 under control of request handling circuitry 38. The request handling circuitry 38 may apply a number of criteria governing when particular requests can be selected, and may control which order the requests are selected in. For example the request handling circuitry 38 may consider factors such as data dependencies between requests (i.e. whether they specify the same address), other ordering constraints enforced by the type of memory region accessed by the request or by other ordering parameters or identifiers specified by the request, and also may consider the efficiency with which different requests can be grouped together in order to ensure more efficient access to memory, e.g. requests targeting the same page in DRAM 10 or NVRAM 12 could be grouped together so that they can be handled faster as a block than if these requests were intermingled with other requests to different pages.

Figure 5:
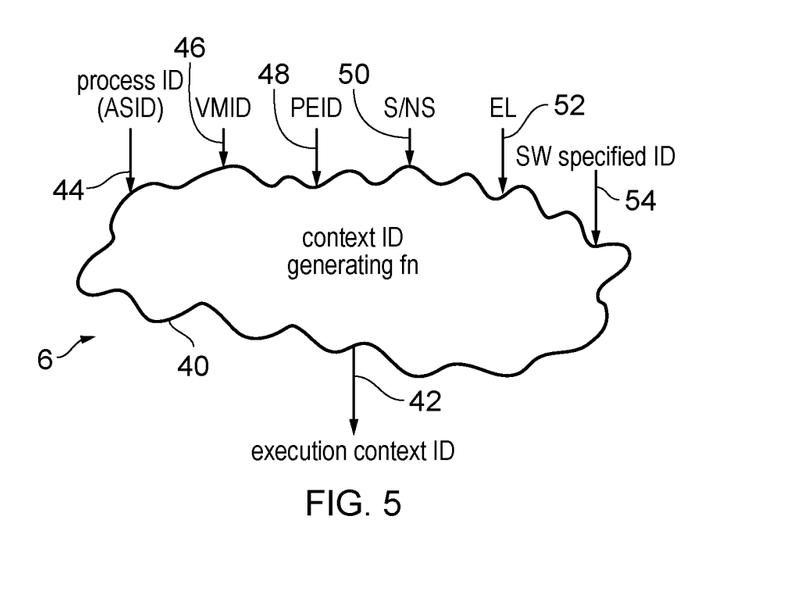
FIG. 5 shows an example of generating an execution context identifier associated with memory access requests.
Figure 6:
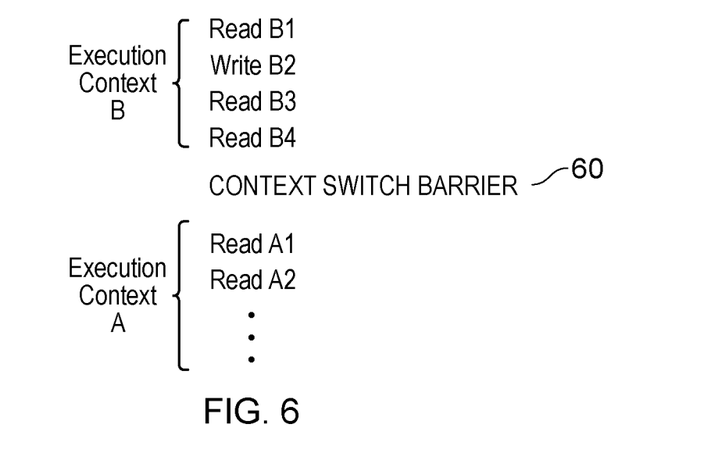
FIG. 6 shows an example of using a context switch barrier indication to indicate when there is an execution context switch.

However, in addition to such factors the request handler 38 may also consider the execution context with which different requests are associated. FIGS. 5 and 6 show two different ways in which the request handling circuitry 38 may be able to identify the context associated with a request. As shown in FIG. 5, in some cases one of the processing elements may include circuitry 40 for implementing a context identifier generating function for generating an execution context identifier 42 to be included with memory access requests generated by the processing element 4. For example the context identifier generating function 40 may be a function of one or more different identifiers associated with the currently executing context being processed by the processing element 4 or based on properties of the processing element 4 itself or the parameters specified by the software executing on the processing element. For example the execution context identifier 42 may be derived from one or more identifiers including any combination of:

A process identifier (or address space identifier ASID) 44 associated with a software process or application executing on the processing element.

A virtual machine identifier (VIMD) 46 associated with a virtual machine or operating system under whose control the application or process is executing.

A processing element identifier (PEID) 48 identifying the specific processing element 4 that is generating the request.

A secure/non-secure mode indication (S/NS) 50 indicating whether the processing element 4 which generated the request was operating in a secure mode of operation or a non-secure mode of operation.

An indication 52 of the current exception level (EL) or privilege level at which the processing element was operating when it generated the request.

A software specified identifier 54 which may be arbitrarily specified by software executing on the processing element independent of the current operating state of the processing element, for example the software specified identifier 54 could be a value written to the register of the processing element by the software.

It will be appreciated that not all of these identifiers may need to be considered in the context identifier generating function 40, but in general by generating an identifier as a function of one or more of these properties then the execution context identifier 42 may characterise a software workload being performed on the processor so as to distinguish it from other workloads. By appending the execution context identifier 42 to memory access requests this can allow the control circuitry 14, 16 to identify which context a given request relates to.

As shown in FIG. 4, requests pending in the read queue 32 or the write queue 34 may be tagged with the corresponding execution context identifiers so that the request handling circuitry 38 is able to identify a number of "virtual" queues 56 each associated with a given context. It will be appreciated that each virtual queue 56 does not necessarily need to be physically partitioned within the read or write queues 32, 34 but could simply correspond to those entries of the respective queues which relate to a given context. By sharing a physical queue structure among multiple contexts this can make it easier to track ordering of requests and address dependencies than if the requests were placed in physically separated queues for each context. Nevertheless, the request handler 38 may implement virtual queues by attempting to group requests from the same context so that they are serviced successively by the memory 10, 12, 18, so as to reduce the number of switches between handling memory access requests associated with one context and handling requests associated with another context.

As shown in FIG. 6, another way of identifying when there is a switch of execution context among the memory access requests being handled by the memory may be to use a context switch barrier indication 60 which can be included in a stream of memory access requests to mark the point at which the requests beyond the barrier relate to a different execution context to the requests before the barrier. For example the context switch barrier 60 could be a memory request which specifies a specific identifier code marking that this is a barrier request rather than an actual memory read or write request to be serviced. Alternatively rather than providing a specific request corresponding to the barrier 60, the last request relating to the earlier execution context or the first request relating to the new execution context could be tagged with a marker to show that this request also functions as a barrier. The barriers can be generated under hardware control within the processing element 4 when a context switch is detected in the software executing on the processing element, or could be triggered under software control so that the software is explicitly able to request that a context switch barrier is inserted into the stream of memory requests to signal to the control circuitry 14, 16 that the subsequently received requests will relate to a different context.

Regardless of how the context switch is signalled to the request handler 38, when the request handling circuitry identifies that a context switch arises, so that there is a transition from handling memory access requests associated with one execution context to memory access requests to another execution context, then the request handling circuitry may issue a signal 62 to trigger performance of a delay masking action. The delay masking action could be performed within the control circuitry 14, 16 itself or by another component of the memory system such as in the memory controller 14 or the actual storage device 10, 12, depending on the type of delay masking action performed. In one example, the delay masking action could be that any open or active pages within the DRAM or NVRAM structure are closed or deactivated, by writing back any open pages from the row buffer 22 so that following the delay masking action the next memory access request to each bank 20 will target a closed page so that the access latency associated with access that closed page is independent of what addresses were being accessed before the delay masking action was carried out. This can be used to ensure that any incoming contexts cannot gain information about the address pattern of access from an earlier context.

Figure 7:
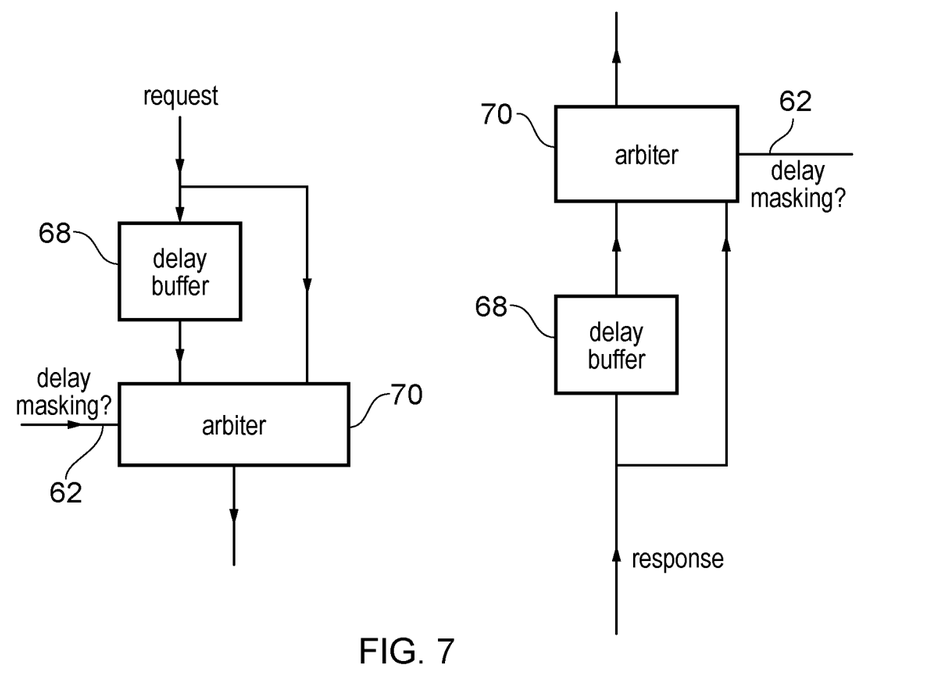
FIG. 7 illustrates an example of delaying a request or a response to a memory access request to mask an actual response delay associated with accessing the memory.

Alternatively, as shown in FIG. 7 another way of carrying out the delay masking may be to provide a delay buffer 68 for adding an additional delay to either the request before it is sent out to the memory or the response to a memory request received from the memory before it is passed back to the upstream component which issued the request. While FIG. 7 shows delays on both the request and response channels it will be appreciated that only one of these may be required. In systems where the memory cannot service requests in a different order to the order in which they are received, it may be acceptable to delay the request. However, in a memory supporting out-of-order servicing of requests, it may be preferable to delay the response to provide a more effective guarantee of the masking delay for the first request(s) serviced after a context switch. Selection circuitry (e.g. an arbiter) 70 may be provided to select whether or not the delay is applied based on the delay masking action trigger signal 62 provided by the request handling circuitry 38. Hence, an additional delay may be provided to simulate a page being closed when it is actually open or to simulate a bank conflict when actually the desired row is open or no row is open in the required bank. Such simulated delays can be useful for masking the effects which can be probed by the attacker based on timing side-channels. During the time when a given request or response is delayed, another request to the same open page could be serviced in the meantime, for example another read or write request, a writeback request or a refresh request for refreshing the contents of the memory which may be useful for certain forms of memory such as DRAM which require periodic refreshing to maintain their state.

It is not essential to apply the delay masking action to every single context switch. Instead the delay masking action could be triggered on a secure adaptive policy so that the action can be enabled hierarchically based on exception level of the corresponding execution context or based on whether the incoming or outgoing context meets certain properties. For example the delay masking action could be triggered on a context switch from a more privileged process to a less privileged process or vice-versa but may not need to be triggered on a context switch between processes operating at the same privilege level for example. In some examples, only context switches from a first execution context of a minimum threshold privilege level or higher could trigger the delay masking action.

Figure 8:
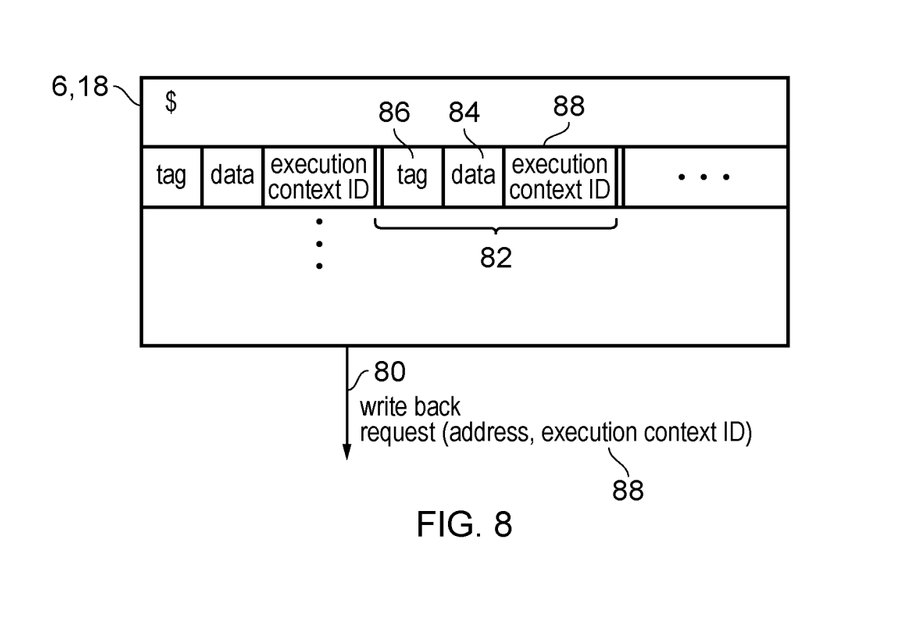
FIG. 8 shows an example of tagging cache entries with the execution context identifier so that a downstream component can identify which context is associated with writeback requests.

As shown in FIG. 8, one form of memory access request that may be received by the interface 30 at the control circuitry 14, 16 may be a cache writeback request 80 which is generated by a cache (e.g. the L1 cache, L2 cache or any further cache 6 within the processing element 4 itself or the system cache 18 within the interconnect 8), to write back data previously written to the cache to the further level cache 18 or main memory 10, 12. In the approach shown in FIG. 8, each cache location 82 may (in addition to the data itself 84 and any tag information 86) specify the execution context identifier 88 associated with the corresponding data, which may be derived by the processing element 4 using the context identifier generating function 40 as shown in FIG. 5 at the time the cached data 84 was allocated to the cache 6, 18. Hence, when the cache controller determines to evict some data from the cache and write it back to memory, the writeback request 80 may be tagged with the execution context identifier 88 read from the corresponding victim cache location, so that the request handler 38 can then map it to a corresponding one of the execution contexts 56 so as to control whether a delay masking action should be triggered on a transition from a writeback request to a memory access request associated with a different context to the one which allocated the data into the cache originally.

Alternatively, as shown in FIG. 4 the write queue 34 may distinguish writeback from other types of memory access request, so that the writeback requests can be grouped together as their own dedicated writeback context 56-W. Hence, the writebacks may be grouped together as their own special context, and when there is a transition from handling writeback requests (regardless of which context actually is associated with the written back data) to handling non-writeback requests associated with a particular execution context, then the delay masking action may be triggered to prevent an attacker gaining side-channel information based on the previously accessed pattern of addresses used by the context which originally allocated the data into the cache before the writeback was triggered by the cache controller.

A third approach could be to treat each individual writeback request as its own separate context so that for any writeback requests serviced by the memory, the delay masking action is triggered before the immediately following memory access request to guard against possible side-channel information leaking from the writeback request, so that the context associated with the subsequent request cannot gain information on which address was written back which could be exploited otherwise by some attackers to yield information on the operation of the context which originally allocated to the data into the cache.

Figure 9:
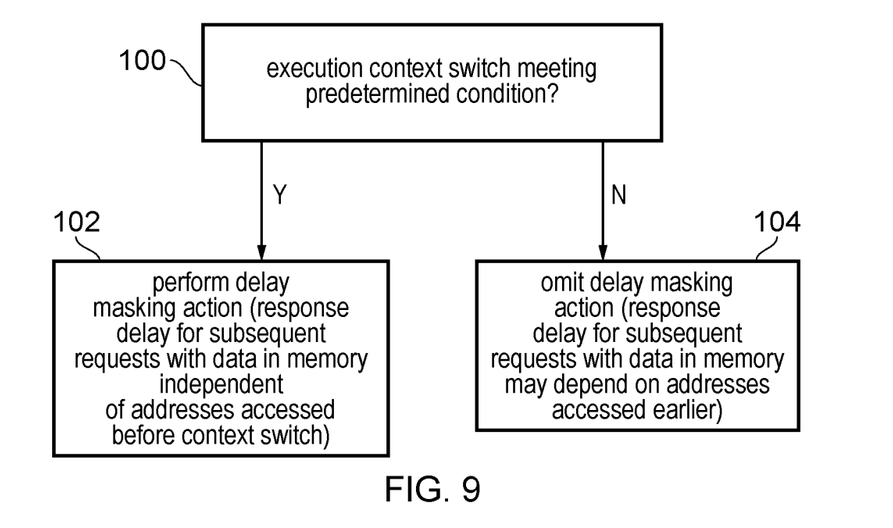
FIG. 9 is a flow diagram showing a method of determining whether to perform a delay masking action.

FIG. 9 is a flow diagram showing a method of controlling access to memory using the control circuitry 14, 16. At step 100 the request handling circuitry 38 determines whether an execution context switch has been identified meeting a predetermined condition. In some implementations an execution context switch may be determined to have occurred at the time when the request handler determines that the memory should switch from handling requests associated with one context to handling requests associated with another context. Whether the context switch meets the predetermined condition may be dependent on properties of the context which could be derived from the corresponding execution context identifiers, such as the exception level. Alternatively the request handling circuitry 38 could maintain a list of certain execution contexts for which additional security is required, and the execution context switch could be determined to meet the predetermined condition if the first execution context (from which memory access requests were handled before the context switch) is on the list of contexts requiring additional security.

If the execution context switch does meet the predetermined condition, then at step 102 the control circuitry 14, 16 triggers the delay masking action to be performed so that the response delay associated with subsequent requests which do have the required data stored in the relevant memory 10, 12, 18 is independent of which addresses were accessed before the context switch. For example the delay masking action could be the additional delay incurred by the delay buffer 68 or could be an instruction to close or open pages within a given memory so that the next request to each bank in the memory will experience a constant delay corresponding to the delay when there is no open page currently retained in the row buffer 22.

On the other hand, if the execution context switch does not meet the predetermined condition then at step 104 the delay masking action is omitted, and in this case the response delay for subsequent requests which target data which is already stored in the memory may depend on the previous addresses accessed by the first execution context before the context switch.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
control circuitry to control access to a memory implemented using a memory technology providing variable access latency, the control circuitry comprising:
  interface circuitry to receive memory access requests for servicing by the memory, and to provide responses to memory access requests serviced by the memory; and
  request handling circuitry to:
    identify an execution context switch comprising a transition from servicing memory access requests associated with a first execution context to servicing memory access requests associated with a second execution context; and
    at least when the execution context switch meets a predetermined condition, trigger a delay masking action to control subsequent memory access requests associated with the second execution context, for which the required data is already stored in the memory, to be serviced with a response delay which is independent of which addresses were accessed by the memory access requests associated with the first execution context, said response delay comprising a delay between receipt of the memory access request by said interface circuitry and provision of a response to the memory access request by said interface circuitry,
  in which the request handling circuitry is configured to one of:
    detect an execution context switch meeting said predetermined condition when a context switch barrier indication is detected in a stream of memory access requests received by the interface circuitry;
    detect said execution context switch based on execution context identifiers associated with at least a subset of the memory access requests received by the interface circuitry; or
    group memory access requests associated with the same execution context together as a group of requests to be serviced consecutively by the memory, and to identify the execution context switch when switching from a group of memory access requests associated with the first execution context to a group of memory access requests associated with the second execution context.

2. The apparatus according to claim 1, in which at least when the execution context switch meets the predetermined condition, the response handling circuitry is configured to ensure that at least one subsequent memory access request associated with the second execution context, for which the required data is already stored in the memory, is serviced with a constant response delay.

3. The apparatus according to claim 2, in which the memory comprises a plurality of storage units accessible in parallel, and said at least one subsequent memory access request comprises at least a first memory access request to each storage unit serviced after the execution context switch.

4. The apparatus according to claim 1, in which after the execution context switch, the request handling circuitry is configured to control servicing of at least one of said subsequent memory access requests associated with the second execution context, for which the required data is already stored in the memory, with a variable response delay depending on the variable access latency provided by the memory.

5. The apparatus according to claim 4, in which said variable access latency of the memory comprises a lower access latency when the memory access request accesses a memory location in a first state than when the memory access request accesses a memory location in a second state, where an access to a memory location in the second state triggers a transition of a corresponding block of one or more memory locations from the second state to the first state; and
   said at least one of said subsequent memory access requests comprises a memory access request to a block of one or more memory locations already accessed by another memory access request serviced since the execution context switch.

6. The apparatus according to claim 1, in which:
   in a case where the request handling circuitry is configured to detect said execution context switch based on execution context identifiers associated with at least a subset of the memory access requests received by the interface circuitry, the apparatus comprises at least one processing element to issue the memory access requests received by the interface circuitry, in which a given processing element is configured to generate the execution context identifier associated with a given memory access request based on at least one of:
      a process identifier or address space identifier associated with a process executing on the processing element;
      a virtual machine identifier associated with a virtual machine executing on the processing element;
      a processing element identifier associated with the given processing element;
      a security mode identifier identifying a current security mode of operation of the given processing element;
      an exception level identifier identifying a current exception level of the given processing element; and
      a software-specified identifier provided by software executing on the processing element.

7. The apparatus according to claim 1, in which when the execution context switch fails to meet said predetermined condition, the request handling circuitry is configured to omit triggering said delay masking action.

8. The apparatus according to claim 1, in which said predetermined condition comprises the second execution context being a context which is prohibited from accessing at least some data which is accessible to the first execution context.

9. The apparatus according to claim 1, in which said predetermined condition comprises the first execution context being one of a predetermined subset of execution contexts.

10. The apparatus according to claim 1, in which said variable access latency of the memory comprises a lower access latency when the memory access request accesses a memory location in a first state than when the memory access request accesses a memory location in a second state, where an access to a memory location in the second state triggers a transition of a corresponding block of one or more memory locations from the second state to the first state; and
    said delay masking action comprises controlling the memory to transition at least one block of one or more memory locations from the first state to the second state.

11. The apparatus according to claim 1, in which said delay masking action comprises delaying a memory access request serviced after the execution context switch or a response to the memory access request serviced after the execution context switch in a delay buffer to mask an actual access latency provided by the memory when servicing said at least one memory access request.

12. The apparatus according to claim 11, in which during a period of delaying the memory access request or the response in the delay buffer, the request handler is configured to control the memory to service at least one other request targeting a same page in the memory as the delayed memory access request.

13. An apparatus comprising:
    control circuitry to control access to a memory implemented using a memory technology providing variable access latency, the control circuitry comprising:
       interface circuitry to receive memory access requests for servicing by the memory, and to provide responses to memory access requests serviced by the memory; and
       request handling circuitry to:
          identify an execution context switch comprising a transition from servicing memory access requests associated with a first execution context to servicing memory access requests associated with a second execution context; and
          at least when the execution context switch meets a predetermined condition, trigger a delay masking action to control subsequent memory access requests associated with the second execution context, for which the required data is already stored in the memory, to be serviced with a response delay which is independent of which addresses were accessed by the memory access requests associated with the first execution context, said response delay comprising a delay between receipt of the memory access request by said interface circuitry and provision of a response to the memory access request by said interface circuitry,
       in which at least one of:
          (i) the request handling circuitry is configured to identify that writeback requests, which request that cached data is written back from a cache to the memory, are associated with a dedicated writeback execution context independent of the execution context which caused the cached data to be allocated to the cache and in response to an execution context switch comprising a transition from servicing writeback requests associated with the dedicated writeback execution context to servicing memory access requests associated with another execution context, the request handling circuitry is configured to perform said delay masking action;
          (ii) following servicing of a given writeback request requesting that cached data is written back from the cache to the memory, the request handling circuitry is configured to perform said delay masking action such that a next memory access request or a next writeback request serviced by the memory, for which the required data is already stored in the memory, is serviced with a response delay independent of the address specified by the given writeback request; or
          (iii) the cache is configured to store cached data in association with an execution context identifier of an execution context corresponding to the cached data and to generate a writeback request to write back a predetermined block of cached data to the memory, the writeback request specifying the execution context identifier associated with the predetermined block of cached data, and the request handling circuitry is configured to identify the execution context switch based on the execution context identifier associated with the writeback request.

14. The apparatus according to claim 1, in which said memory comprises DRAM.

15. A method for controlling access to a memory implemented using a memory technology providing variable access latency, the method comprising:

receiving memory access requests for servicing by the memory, and providing responses to memory access requests serviced by the memory;

identifying an execution context switch comprising a transition from servicing memory access requests associated with a first execution context to servicing memory access requests associated with a second execution context; and at least when the execution context switch meets a predetermined condition, triggering a delay masking action to control subsequent memory access requests associated with the second execution context, for which the required data is already stored in the memory, to be serviced with a response delay which is independent of which addresses were accessed by the memory access requests associated with the first execution context, said response delay comprising a delay between receipt of the memory access request by said interface circuitry and provision of a response to the memory access request by said interface circuitry, in which one of:

the execution context switch meeting said predetermined condition is identified when a context switch barrier indication is detected in a stream of memory access requests received by the interface circuitry;

the execution context switch is identified based on execution context identifiers associated with at least a subset of the memory access requests received by the interface circuitry; or the execution context switch is identified, when switching from a group of memory access requests associated with the first execution context and serviced consecutively by the memory to a group of memory access requests associated with the second execution context and serviced consecutively by the memory.

* * * * *